United States Patent
Campbell

(10) Patent No.: US 6,190,050 B1
(45) Date of Patent: Feb. 20, 2001

(54) SYSTEM AND METHOD FOR PREPARING WEAR-RESISTANT BEARING SURFACES

(75) Inventor: Steven Campbell, Moore, OK (US)

(73) Assignee: Camco International, Inc.

( * ) Notice: Under 35 U.S.C. 154(b), the term of this patent shall be extended for 0 days.

(21) Appl. No.: 09/338,403

(22) Filed: Jun. 22, 1999

(51) Int. Cl.$^7$ .................................................. F16C 17/00
(52) U.S. Cl. ................. 384/129; 29/898.041; 29/898.14; 384/420; 384/907.1
(58) Field of Search ................................. 384/907.1, 303, 384/304, 420, 129; 29/898.041, 898.14

(56) References Cited

U.S. PATENT DOCUMENTS

| T102,901 | 4/1983 | Offenbacher . | |
|---|---|---|---|
| 3,235,316 | 2/1966 | Whanger . | |
| 4,329,122 | * 5/1982 | Owada et al. | 384/420 X |
| 4,345,798 | 8/1982 | Cortes . | |
| 4,410,054 | 10/1983 | Nagel et al. . | |
| 4,468,138 | 8/1984 | Nagel . | |
| 4,560,014 | * 12/1985 | Geczy | 384/285 X |
| 4,620,601 | 11/1986 | Nagel . | |
| 4,662,348 | 5/1987 | Hall et al. . | |
| 4,708,496 | 11/1987 | McPherson . | |
| 4,720,199 | 1/1988 | Geczy et al. . | |
| 4,729,440 | * 3/1988 | Hall | 384/907.1 X |
| 4,732,491 | 3/1988 | Geczy . | |
| 4,756,631 | 7/1988 | Jones . | |
| 4,764,036 | 8/1988 | McPherson . | |
| 4,789,251 | 12/1988 | McPherson et al. . | |
| 4,892,420 | 1/1990 | Kruger . | |
| 5,037,212 | 8/1991 | Justman et al. . | |
| 5,092,687 | 3/1992 | Hall . | |
| 5,147,082 | * 9/1992 | Krause et al. | 228/1.1 |
| 5,253,939 | 10/1993 | Hall . | |
| 5,342,129 | 8/1994 | Dennis et al. . | |
| 5,364,192 | 11/1994 | Damm et al. . | |
| 5,368,398 | 11/1994 | Damm et al. . | |
| 5,480,233 | 1/1996 | Cunningham . | |
| 5,498,081 | 3/1996 | Dennis et al. . | |

* cited by examiner

Primary Examiner—Rodney H. Bonck
(74) Attorney, Agent, or Firm—Fletcher, Yoder & Van Someren

(57) ABSTRACT

A wear-resistant bearing system utilizes a grid pattern of wear-resistant material. In instances where two bearing surfaces slide with respect to one another, such as with a thrust bearing, wear-resistant material strips are inlaid in the surrounding support material. The strips of wear-resistant material are arranged on each component such that the strips intersect one another when one component is moved with respect to the other. This transverse relationship or grid pattern promotes extremely long component life.

22 Claims, 4 Drawing Sheets

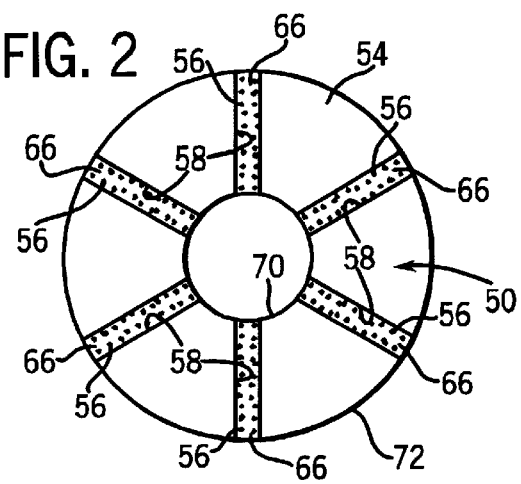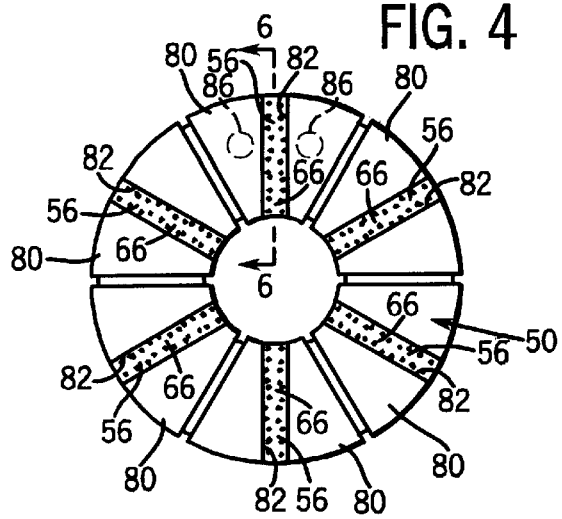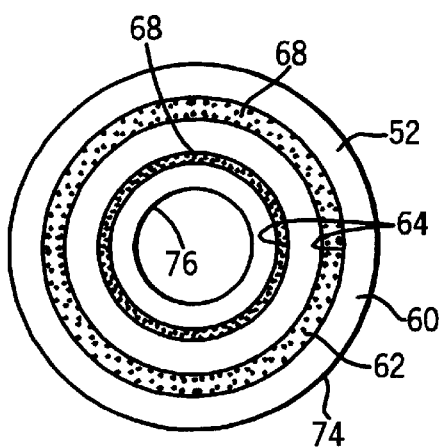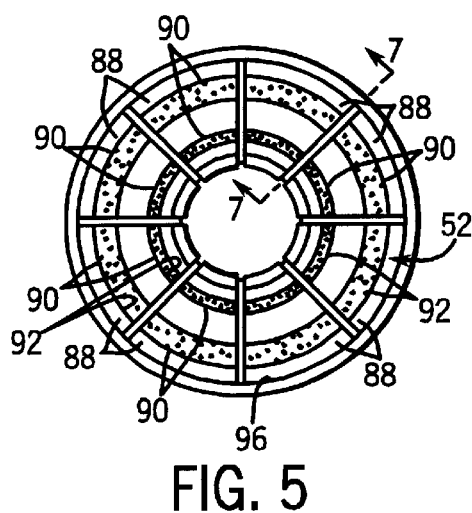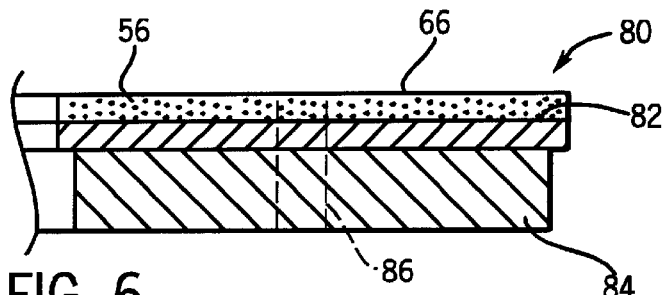

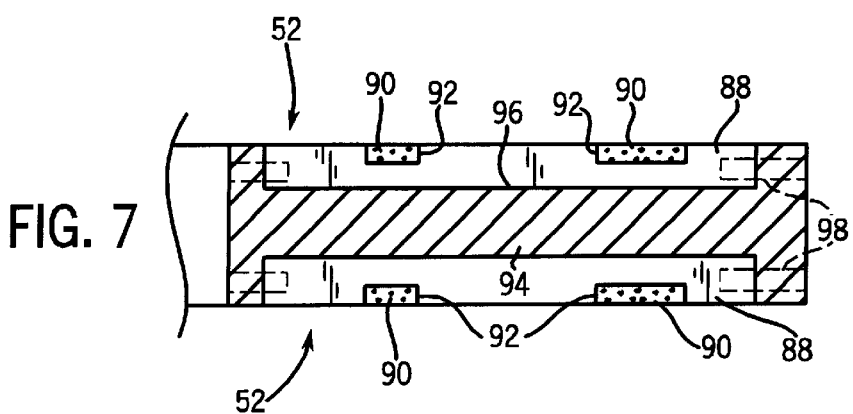
FIG. 7
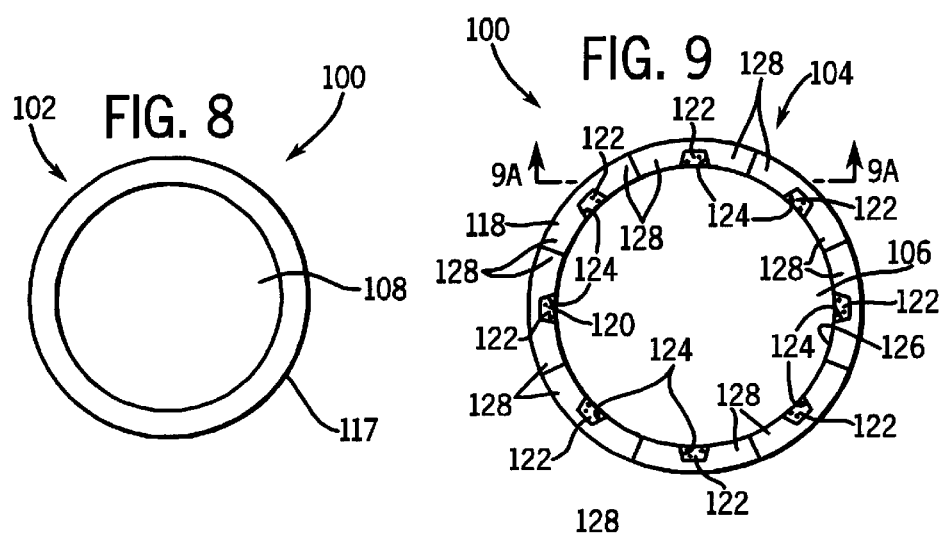
FIG. 8
FIG. 9
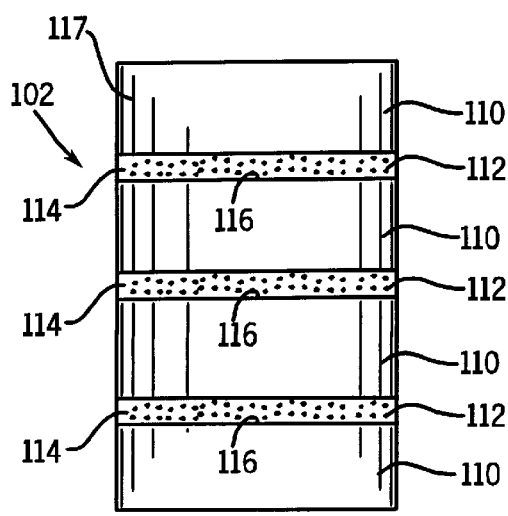
FIG. 8A
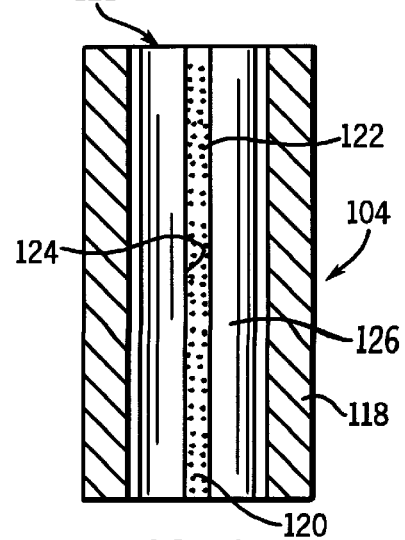
FIG. 9A

SYSTEM AND METHOD FOR PREPARING WEAR-RESISTANT BEARING SURFACES

FIELD OF THE INVENTION

The present invention relates generally to wear-resistant surfaces for bearings, and particularly to bearings, bushings and runners that require wear-resistant usage, such as those utilized in electric submergible pumping systems.

BACKGROUND OF THE INVENTION

Many types of bearings, bushings and runners have surfaces that slide against a corresponding surface. Such surfaces are subject to wear, and must be replaced if sufficient wear occurs. Replacement or repair of those components can be costly and time-consuming.

For example, in electric submergible pumping systems, utilized in pumping oil and/or other production fluids from producing wells, a variety of thrust bearings, corresponding runners, and radial bearings or bushings are incorporated into the components of the system. However, such systems typically are used in wellbores drilled deep beneath the earth's surface. The time and expense required to withdraw an electric submergible pumping system from the earth to service or replace bearings or other components is extremely costly with respect to both the removal procedure and lost production. Accordingly, it would be advantageous to provide wear surfaces with wear-resistant materials that reduce or eliminate the need for servicing or replacement of such components.

Various measures are taken to lengthen the life of bearing surfaces, such as the surfaces of thrust bearings and cooperating runners. For example, hardened steels and tungsten carbide have been utilized in making these bearing components. Additionally, circular inserts of polycrystalline diamond have been mounted on or in the bearings. Polycrystalline diamond has traditionally been utilized in small, circular compacts that each must be properly mounted and oriented to form a bearing surface. It would be advantageous to utilize an extremely wear-resistant material, such as polycrystalline diamond, without the constraints of multiple independent compacts.

SUMMARY OF THE INVENTION

The present invention features a thrust bearing system. The system comprises a thrust bearing including a thrust surface formed of at least two different materials. Of the two different materials, a first material has greater wear-resistant properties than a second material, and the first material is arranged in strips along the second material. The resulting contact surface is oriented to contact the thrust surface during relative rotational motion between the thrust bearing and the runner. The contact surface has at least two different materials in which a first runner material has greater wear-resistant properties than a second runner material. The first runner material is disposed in strips that are oriented generally transversely with respect to the strips on the thrust surface.

According to another aspect of the present invention, a bearing system is provided for use in an electric submergible pumping system. The bearing system includes a first bearing component and a second bearing component that slidingly move with respect to one another. The first and second bearing components each have inlaid strips of at least one wear-resistant material, such as polycrystalline diamond. The inlaid strips are arranged in a grid pattern.

According to another aspect of the present invention, a method is provided for increasing the life of load bearing systems in which a first surface slides with respect to a second surface. The method includes deploying a first plurality of strips of wear-resistant material along the first surface. Additionally, the method includes deploying a second plurality of strips of wear-resistant material along the second surface. The method further includes orienting the first plurality of strips generally transversely with respect to the second plurality of strips, and placing the first plurality of strips in sliding contact with the second plurality of strips.

BRIEF DESCRIPTION OF THE DRAWINGS

The invention will hereafter be described with reference to the accompanying drawings, wherein like reference numerals denote like elements, and:

FIG. 2 is a view of the contact surface of a thrust bearing illustrated in FIG. 1A;

FIG. 3 is a view of a contact surface of the thrust bearing runner illustrated in FIG. 2;

FIG. 4 is an alternate embodiment of the thrust bearing illustrated in FIG. 3;

FIG. 5 is an alternate embodiment of the thrust bearing runner illustrated in FIG. 4;

FIG. 6 is a cross-sectional view taken generally along line 6—6 of FIG. 5;

FIG. 7 is a cross-sectional view taken generally along line 7—7 of FIG. 6;

FIG. 8 is a top view of the inner component of a radial bearing or bushing;

FIG. 8A is a front view of the component illustrated in FIG. 8;

FIG. 9 is a top view of an external component for a radial bearing or bushing; and FIG. 9A is a cross-sectional view taken generally along line 9A—9A of FIG. 9.

DETAILED DESCRIPTION OF THE PREFERRED EMBODIMENTS

The present invention can be utilized in a variety of machines in numerous different environments where wear-resistance on bearing surfaces is important. For purposes of explanation, the following description involves a unique and exemplary use of the extremely wear-resistant bearing surfaces in an electric submergible pumping system. This exemplary application, however, should not be construed as limiting the scope of the claims.

Figure 1:
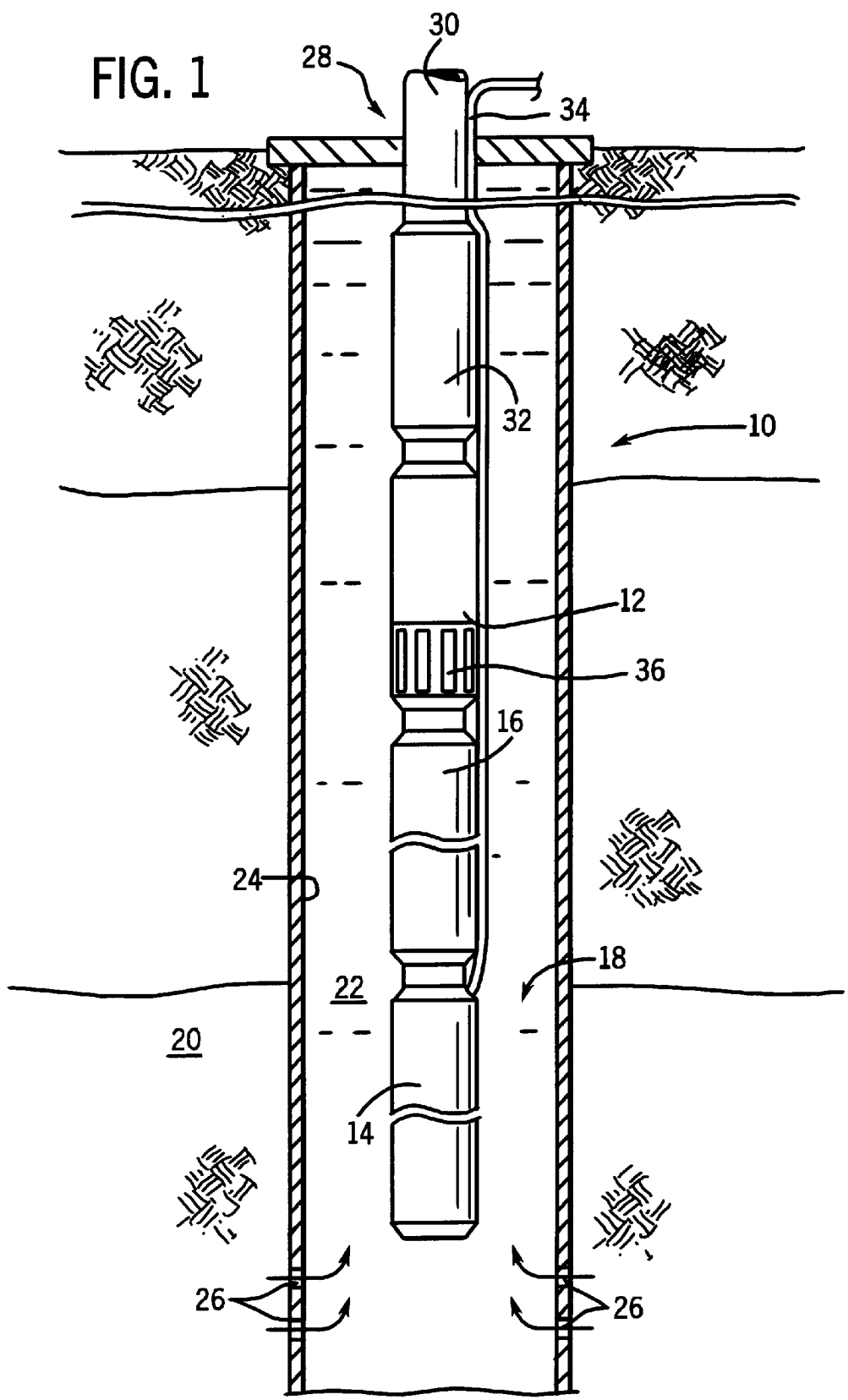
FIG. 1 is a front elevational view of an exemplary pumping system disposed within a wellbore.

Referring now to FIG. 1, an exemplary electric submergible pumping system 10 is illustrated. Pumping system 10 may comprise a variety of components depending on the particular application or environment in which it is used. Typically, pumping system 10 includes at least a centrifugal pump 12, a motor 14 and a motor protector 16.

In the illustrated example, system 10 is designed for deployment in a well 18 within a geological formation 20 containing desirable production fluids, such as petroleum. In a typical application, a wellbore 22 is drilled and lined with a wellbore casing 24. Wellbore casing 24 may include a plurality of openings 26 through which production fluids may flow into wellbore 22.

Pumping system 10 is deployed in wellbore 22 by a deployment system 28 that may have a variety of forms and configurations. For example, deployment system 28 may comprise tubing 30 connected to submergible pump 12 by a connector 32. Power is provided to submergible motor 14 via a power cable 34. Motor 14, in turn, powers pump 12 which draws production fluid in through a pump intake 36 and pumps the production fluid to the surface via tubing 30. As pump 12 pushes fluid upward through tubing 30, a substantial downforce must be absorbed. Accordingly, motor 14 and motor protector 16 commonly utilize thrust bearings to counter this downforce. Additionally, radial bearings or bushings may be used in a variety of locations to support the drive shaft extending between motor 14 and pump 12.

It should be noted that the illustrated submergible pumping system 10 is merely an exemplary embodiment. Other components can be added to this system, and other deployment systems may be implemented. Additionally, the production fluids may be pumped to the surface through tubing 30 or through the annulus formed between deployment system 28 and wellbore casing 24. In any of these configurations, it is desirable to attain the benefits of long lasting bearing or wear surfaces in accordance with the present invention.

Figure 1A:
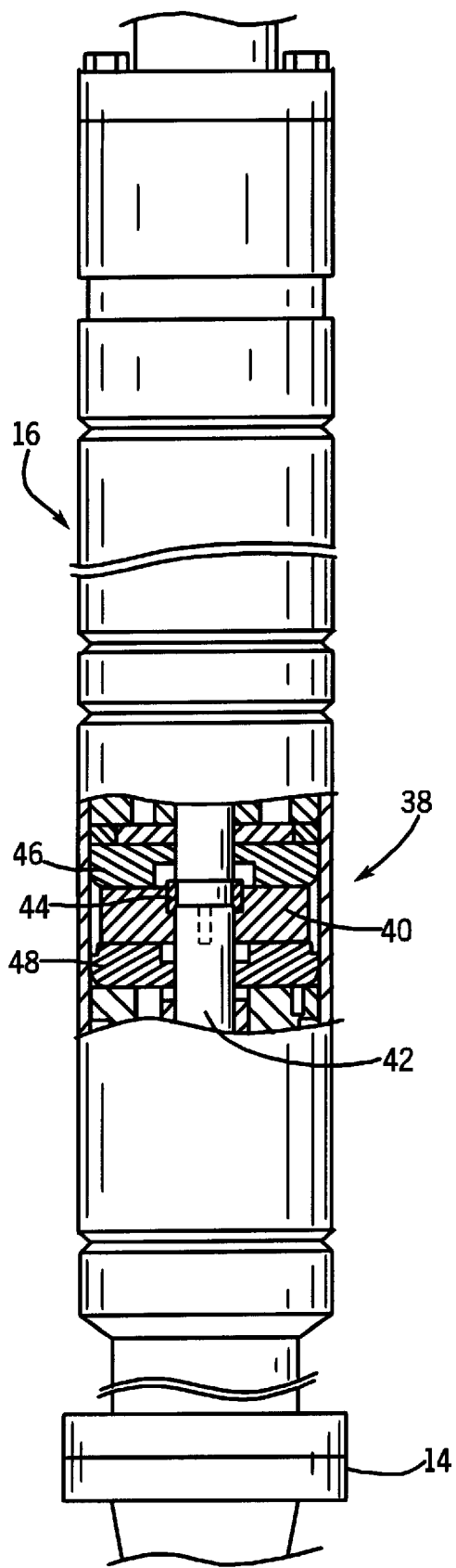
FIG. 1A is a partial cross-sectional view taken generally along the axis of the motor protector of FIG. 1.

Referring to FIG. 1A, an exemplary embodiment of a thrust bearing system 38 is illustrated. It should be noted that a wide variety of thrust bearing system styles and configurations may be utilized in obtaining the benefits of the improved wear characteristics associated with the present invention. As illustrated, thrust bearing system 38 includes a thrust bearing runner 40 connected to a drive shaft 42 by an appropriate catch 44 that prevents rotation of the thrust bearing runner 40 with respect to shaft 42.

A stationary, upper thrust bearing 46 is disposed above thrust bearing runner 40. Similarly, a lower thrust bearing 48 is disposed below thrust bearing runner 40. Bearings 46 and 48 counter axial forces that are directed through drive shaft 42 and thrust bearing runner 40. However, the rotation of thrust bearing runner 40 against an adjacent bearing 46 or 48 under load creates the potential for high surface wear and degradation of bearing system components.

Referring generally to FIGS. 2 and 3, thrust bearing system 38 can be described more fully. In FIG. 2, a thrust bearing contact surface 50 is designed for sliding engagement with a thrust runner contact surface 52 of thrust runner 40, illustrated in FIG. 3. Thrust bearing contact surface 50 may be the contact surface of, for example, either upper thrust bearing 46 or lower thrust bearing 48.

Thrust bearing contact surface 50 comprises at least two different materials including a support material 54 and a wear-resistant material 56 having wear-resistant properties greater than that of support material 54. An exemplary support material 54 is tungsten carbide, while an exemplary wear-resistant material 56 is polycrystalline diamond or polycrystalline boron nitride. In the preferred embodiment, wear-resistant material 56 is inlaid within corresponding grooves 58 formed in support material 54.

Similarly, thrust runner contact surface 52 includes a support material 60 and a wear-resistant material 62 that has wear-resistant properties greater than that of support material 60. Again, an exemplary support material 60 is tungsten carbide, and exemplary wear-resistant materials 62 are polycrystalline diamond or polycrystalline boron nitride. Preferably, wear-resistant material 62 is inlaid within corresponding grooves 64 formed in support material 60.

The thrust bearing wear-resistant material 56 and the runner wear-resistant material 62 are arranged to permit long lasting surface integrity, and to limit any detrimental effects resulting from the rotation of contact surface 50 against thrust runner contact surface 52. Preferably, wear-resistant material 56 is arranged in a plurality of strips 66. Similarly, thrust runner wear-resistant material 62 also is oriented in one or more strips 68.

Thrust bearing strips 66 are arranged to extend generally transversely to strip or strips 68. For example, in a preferred embodiment, strips 66 are generally linear strips that extend radially outward along contact surface 50 from an inner aperture 70, through which drive shaft 42 extends, to an outer perimeter 72, that typically is circular in shape. In the illustrated embodiment, there are six such strips of wear-resistant material 56. Strips 68, on the other hand, are arranged in concentric circles at distinct positions radially inward from a circular outer perimeter 74 of thrust runner contact surface 52. The strips 68 are disposed radially outward of a central aperture 76 through which drive shaft 42 extends.

When thrust bearing system 38 is assembled, each strip 66 intersects the strips 68 in a generally transverse orientation. Thus, the plurality of strips 66 form a grid pattern with strips 68. This cross pattern facilitates the formation of thrust bearing system components, the longevity of the wear surfaces, and the smooth movement of contact surface 50 with respect to thrust runner contact surface 52.

Referring to FIGS. 4 and 5, an alternate embodiment of thrust bearing system 38 is illustrated. In this embodiment, thrust bearing contact surface 50 is disposed on a plurality of separable pieces 80. Each separable piece or component 80 includes a strip 66 of inlaid wear-resistant material 56, similar to that described with reference to FIG. 2. For example, strips of polycrystalline diamond or polycrystalline boron nitride may be inlaid within grooves 82, as illustrated in FIGS. 4 and 6.

Typically, each separable piece 80 is mounted to a base layer 84 by, for instance, an appropriate fastener 86, such as a set screw. Depending on the design of thrust bearing 46 or 48, fasteners 86 may be oriented to extend through each separable piece 80 into base layer 84, through base layer 84 into separable piece 80, or radially, as described below with respect to the thrust bearing runner.

As illustrated best in FIG. 5, thrust runner contact surface 52 may be formed on a plurality of separable runner pieces 88. Each separable runner piece 88 includes a strip portion 90 of each strip 68 of wear-resistant material 62. As described with reference to FIG. 3, strips 68 may be formed of a wear-resistant material, such as polycrystalline diamond or polycrystalline boron nitride, inlaid in corresponding grooves 92 of each separable runner piece 88.

Separable runner pieces 88 preferably are attached to a runner base 94 that includes a recessed area 96 for receiving separable runner pieces 88. In the illustrated embodiment, a recessed area 96 is disposed on the top and the bottom of runner 40 to form two contact surfaces 52 for sliding engagement with both thrust bearing 46 and thrust bearing 48, respectively. (See FIG. 7). The separable pieces are held in place by, for instance, appropriate fasteners 98. Fasteners 98 may comprise set screws extending radially through base 94 into each separable piece 88 in one or more positions.

The use of separable pieces, 80, 88 in the formation of bearing and runner surfaces aids in the manufacture of thrust bearing system 38. The smaller components facilitate the use of extremely hard materials, such as polycrystalline diamond and polycrystalline boron nitride.

Referring to FIGS. 8 through 9A, another embodiment of the present invention is illustrated. In this embodiment, a grid pattern of wear-resistant material strips is established for a radial bearing or bushing 100. An exemplary radial bearing or bushing 100 includes an inner component 102 (see FIGS. 8 and 8A) and an outer component 104 (see FIGS. 9 and 9A). As with a variety of conventional bearings or bushings, inner component 102 is designed for attachment to a shaft, such as drive shaft 42, and is sized for rotation within a hollow interior 106 of outer component 104.

Inner component 102 typically is circular in cross-section, as illustrated best in FIG. 8, and includes a central, axial opening 108 for receiving a shaft or other object to which it is affixed. Component 102 is made from at least two different materials, including a support material 110 and a wear-resistant material 112. As described above, wear-resistant material 112 preferably is arranged in a plurality of strips 114. By way of example, strips 114 may be inlaid in corresponding grooves 116 formed in support material 110. In the illustrated embodiment, grooves 116 and strips 114 extend in a circular fashion about the axis of inner component 102 along a circular perimeter of an outer surface 117. As described above, exemplary wear-resistant materials include polycrystalline diamond and polycrystalline boron nitride, and an exemplary support material is tungsten carbide.

Outer component 104 is sized such that inner component 102 may be rotatably received within hollow interior 106. Outer component 104 is formed from at least two materials, including a support material 118 and a material 120 having greater wear-resistant properties than support material 118. Preferably, wear-resistant material 120 is formed as a plurality of strips 122 that intersect or extend generally transversely to strips 114 of inner component 102 when component 102 is received in hollow interior 106. Strips 122 are received in corresponding grooves 124 formed in an interior surface 126 that defines hollow interior 106. In the illustrated embodiment, strips 122 are generally linear and disposed parallel with the axis of outer component 104.

Optionally, outer component 104 may be made from a plurality of separable pieces 128. Preferably, each separable piece 128 includes a section of support material 118 having a groove 124 for receiving a strip 122. The plurality of separable pieces 128 may be held in place by an external, circumferential band (not shown). The use of separable pieces 128 facilitates the manufacture of strips 122 and the overall outer component 104.

In operation, the radial bearing/bushing 100 obtains the benefit of long lasting wear as with the thrust bearings described above. The wear-resistant material, such as polycrystalline diamond or polycrystalline boron nitride is arranged in a grid pattern between two components that slide with respect to one another. One component includes strips arranged in a first direction, while the cooperating component includes wear-resistant strips arranged in a second direction that is perpendicular or at least transverse to the orientation of the strips on the adjacent, cooperating component. The established grid pattern of wear-resistant materials promotes reduced wear, longer component life, smooth operation and ease of manufacture.

It will be understood that the foregoing description is of preferred exemplary embodiments of this invention, and that the invention is not limited to the specific forms shown. For example, a variety of other bearing styles may be utilized; the strips of wear-resistant material formed on mating or cooperating components can be created in a variety of grid patterns; the strips may be straight, arcuate or a mixture of straight and arcuate depending on the specific design of the components; if bearing components are formed by multiple, separable components, those components may be connected to one another or to a supporting base structure in a variety of ways; and additional or differing materials may be used in the construction of the cooperating load bearing components. These and other modifications may be made in the design and arrangement of the elements without departing from the scope of the invention as expressed in the appended claims.

What is claimed is:

1. A thrust bearing system, comprising:
    a thrust bearing including a thrust surface having at least two different materials in which a first material has greater wear-resistant properties than a second material, the first material being arranged in at least one bearing strip along the second material; and;
    a runner having a contact surface oriented to contact the thrust surface during relative motion between the thrust bearing and the runner, the contact surface having at least two different materials in which a first runner material has greater wear-resistant properties than a second runner material, the first runner material being disposed in at least one runner strip oriented generally transversely with respect to the at least one bearing strip during the relative rotational motion.

2. The thrust bearing system as recited in claim 1, wherein the first material comprises polycrystalline diamond.

3. The thrust bearing system as recited in claim 2, wherein the first runner material comprises polycrystalline diamond.

4. The thrust bearing system as recited in claim 3, wherein the second material comprises tungsten carbide.

5. The thrust bearing system as recited in claim 4, wherein the second runner material comprises tungsten carbide.

6. The thrust bearing system as recited in claim 1, wherein the first material comprises polycrystalline boron nitride.

7. The thrust bearing system as recited in claim 6, wherein the first runner material comprises polycrystalline boron nitride.

8. The thrust bearing system as recited in claim 1, wherein the thrust bearing has a generally circular perimeter and the at least one bearing strip comprises a plurality of bearing strips oriented to extend generally radially outwardly on the thrust surface.

9. The thrust bearing system as recited in claim 8, wherein the runner has a generally circular perimeter and the at least one runner strip is generally circular in shape and disposed radially inward from the generally circular perimeter.

10. The thrust bearing system as recited in claim 9, wherein the thrust surface is disposed on a plurality of separable pieces.

11. The thrust bearing system as recited in claim 10, wherein each separable piece is a bearing strip.

12. The thrust bearing system as recited in claim 11, wherein the plurality of bearing strips comprise polycrystalline diamond.

13. A bearing system for use in an electric submergible pumping system, comprising:
    a thrust bearing; and
    a thrust bearing runner that slidingly engages the thrust bearing, the thrust bearing and the thrust bearing runner each having inlaid strips of at least one wear-resistant material, the inlaid strips being arranged in a grid pattern.

14. The bearing system as recited in claim 13, wherein the thrust bearing and the thrust bearing runner are concentric.

15. The bearing system as recited in claim 13, wherein the inlaid strips comprise polycrystalline diamond.

16. The bearing system as recited in claim 13, wherein the inlaid strips comprise polycrystalline boron nitride.

17. The bearing system as recited in claim 13, wherein the grid pattern is formed by inlaid strips oriented in a first direction and inlaid strips oriented in a second direction, the inlaid strips oriented in the first direction being on the first component and the inlaid strips oriented in the second direction being on the second component.

18. A method for increasing the life of load bearing systems in which a first surface slides with respect to a second surface, comprising:

deploying a first plurality of strips of wear-resistant material along the first surface;

deploying a second plurality of strips of wear-resistant material along the second surface;

orienting the first plurality of strips generally transversely with respect to the second plurality of strips; and placing the first plurality of strips in sliding contact with the second plurality of strips.

19. The method as recited in claim 18, wherein deploying a first plurality of strips includes inlaying polycrystalline diamond strips in a surrounding material.

20. The method as recited in claim 19, wherein deploying a second plurality of strips includes inlaying polycrystalline diamond strips in a surrounding material.

21. The method as recited in claim 18, wherein orienting includes orienting the second plurality of strips in generally concentric circles.

22. The method as recited in claim 21, wherein orienting includes orienting the first plurality of strips as generally linear strips that intersect the generally concentric circles.

* * * * *